United States Patent
Dord et al.

(10) Patent No.: US 11,313,560 B2
(45) Date of Patent: Apr. 26, 2022

(54) COMBUSTOR ASSEMBLY FOR A HEAT ENGINE

(71) Applicant: General Electric Company, Schenectady, NY (US)

(72) Inventors: Anne Dord, Mason, OH (US); Nayan Vinodbhai Patel, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 772 days.

(21) Appl. No.: 16/038,758

(22) Filed: Jul. 18, 2018

(65) Prior Publication Data
US 2020/0025383 A1    Jan. 23, 2020

(51) Int. Cl.
*F23R 3/28*    (2006.01)
*F02C 3/04*    (2006.01)
*F02C 7/18*    (2006.01)

(52) U.S. Cl.
CPC .............. *F23R 3/28* (2013.01); *F02C 3/04* (2013.01); *F02C 7/18* (2013.01); *F05D 2240/35* (2013.01); *F05D 2260/202* (2013.01); *F23R 2900/03042* (2013.01)

(58) Field of Classification Search
CPC .......... F23R 3/283; F23R 3/286; F23R 3/002; F23R 3/60; F23R 3/04; F23R 3/06
See application file for complete search history.

(56) References Cited

U.S. PATENT DOCUMENTS

| | | | | |
|---|---|---|---|---|
| 3,881,863 | A | * 5/1975 | Creuz | F23D 17/00 432/222 |
| 5,636,510 | A | * 6/1997 | Beer | F23R 3/286 60/39.23 |
| 5,918,467 | A | 7/1999 | Kwan | |
| 5,941,076 | A | 8/1999 | Sandelis | |

(Continued)

FOREIGN PATENT DOCUMENTS

| | | |
|---|---|---|
| CN | 102175045 A | 9/2011 |
| CN | 106338082 A | 1/2017 |
| EP | 2003398 A2 | 12/2008 |

OTHER PUBLICATIONS

U.S. Appl. No. 15/883,573, filed Jan. 30, 2018.
Chinese Search Report and Office Action Corresponding to Application No. 201910649932 dated May 15, 2020.

*Primary Examiner* — Todd E Manahan
*Assistant Examiner* — Thuyhang N Nguyen
(74) *Attorney, Agent, or Firm* — Venable LLP; Edward A. Kmett; Michele V. Frank (57) ABSTRACT

A combustor assembly for a heat engine is generally provided. The combustor assembly defines a fuel nozzle centerline and a radial direction extended from the nozzle centerline. The combustor assembly includes a fuel nozzle disposed at least partially concentric to the nozzle centerline. The fuel nozzle defines a fuel injection opening. A deflector assembly is defined around the nozzle centerline extended therethrough. The deflector assembly includes a deflector wall extended at least partially along the radial direction. The deflector assembly includes a conical portion defined around the nozzle centerline. The conical portion defines a fuel nozzle opening. A plurality of openings is defined through the conical portion radially adjacent to the fuel injection opening at the fuel nozzle.

17 Claims, 7 Drawing Sheets

(56) References Cited

U.S. PATENT DOCUMENTS

| | | |
|---|---|---|
| 5,956,955 A | 9/1999 | Schmid |
| 7,260,936 B2 | 8/2007 | Patel et al. |
| 7,328,580 B2 | 2/2008 | Lee et al. |
| 7,328,582 B2 | 2/2008 | Sandelis et al. |
| 7,451,600 B2 | 11/2008 | Patel et al. |
| 7,509,813 B2 | 3/2009 | Stastny |
| 7,541,600 B2 | 6/2009 | Neuhauser et al. |
| 7,614,235 B2 | 11/2009 | Burd et al. |
| 7,631,502 B2 | 12/2009 | Burd et al. |
| 7,654,091 B2 | 2/2010 | Al-Roub et al. |
| 7,856,830 B2 | 12/2010 | Alkabie |
| 7,954,325 B2 | 6/2011 | Burd et al. |
| 7,954,326 B2 | 6/2011 | Lai et al. |
| 7,992,391 B2 | 8/2011 | Caboche et al. |
| 8,146,365 B2 * | 4/2012 | Shum ................ F23D 11/108 60/740 |
| 8,763,399 B2 | 7/2014 | Dodo et al. |
| 9,322,560 B2 | 4/2016 | Erbas-Sen et al. |
| 9,506,652 B2 | 11/2016 | Carrere et al. |
| 9,746,184 B2 | 8/2017 | Papple et al. |
| 2006/0156734 A1 * | 7/2006 | Bland ..................... F23R 3/12 60/776 |
| 2010/0313569 A1 | 12/2010 | Boardman et al. |
| 2013/0078582 A1 | 3/2013 | Pidcock |
| 2013/0192233 A1 | 8/2013 | Eastwood et al. |
| 2014/0090402 A1 | 4/2014 | Erbas-Sen et al. |
| 2016/0025342 A1 | 1/2016 | Erbas-Sen et al. |
| 2016/0238250 A1 | 8/2016 | Moura et al. |
| 2017/0009986 A1 * | 1/2017 | Patel ..................... F02C 3/04 |
| 2017/0023251 A1 * | 1/2017 | Leparoux ............. F23R 3/286 |

* cited by examiner

COMBUSTOR ASSEMBLY FOR A HEAT ENGINE

FIELD

The present subject matter relates to combustor assembly structures for heat engines.

BACKGROUND

Combustors and the gas turbine engines into which they are installed are required to meet or exceed increasingly stringent emissions requirements. Combustion emissions are in part a function of a temperature of combustion products and residence time within the combustor before egressing downstream to a turbine section. Combustion emissions may further be a function of an amount of cooling air mixed with the combustion products. For example, combustor walls for gas turbine engines are exposed to high gas temperatures from combustion products, resulting in deterioration that further requires costly repair or replacement.

However, cooling air used within a gas turbine engine may provide structural durability for combustor walls while adversely affecting emissions, such as via affecting residence time or pattern factor or temperature profile of the combustion gases. As such, there is a need for a combustor that improves structural durability of combustor walls while further improving emissions output.

BRIEF DESCRIPTION

Aspects and advantages of the invention will be set forth in part in the following description, or may be obvious from the description, or may be learned through practice of the invention.

An aspect of the present disclosure is directed to a combustor assembly for a heat engine. The combustor assembly defines a fuel nozzle centerline and a radial direction extended from the nozzle centerline. The combustor assembly includes a fuel nozzle disposed at least partially concentric to the nozzle centerline. The fuel nozzle defines a fuel injection opening. A deflector assembly is defined around the nozzle centerline extended therethrough. The deflector assembly includes a deflector wall extended at least partially along the radial direction. The deflector assembly includes a conical portion defined around the nozzle centerline. The conical portion defines a fuel nozzle opening. A plurality of openings is defined through the conical portion radially adjacent to the fuel injection opening at the fuel nozzle.

In various embodiments, the plurality of openings is defined in adjacent circumferential arrangement along the conical portion. In one embodiment, the plurality of openings defines a first plurality of openings circumferentially spaced apart from a second plurality of openings. In another embodiment, the first plurality of openings is circumferentially spaced apart from the second plurality of openings by between 3 degrees and 15 degrees. In still another embodiment, a downstream-most axial row of the plurality of openings is offset circumferentially relative to an upstream-most row of the plurality of openings by between 3 degrees and 17 degrees.

In still various embodiments, the plurality of openings defines a first axial plurality of openings axially spaced apart from a second axial plurality of openings. In one embodiment, the first axial plurality of openings defines a first opening geometry and the second axial plurality of openings defines a second opening geometry different from the first opening geometry. In another embodiment, the first opening geometry defines a cross-sectional area between 5% and 50% greater than the second opening geometry. In yet another embodiment, the first opening geometry defines a substantially circular cross-sectional area. In still another embodiment, the second opening geometry defines a non-circular cross-sectional area.

In still yet various embodiments, a fuel-oxidizer mixture egresses from the fuel injection opening. The plurality of openings is disposed along the conical portion substantially corresponding to a trajectory of the fuel-oxidizer mixture egressed from the fuel injection opening. In one embodiment, the deflector assembly further defines a groove extended axially along the conical portion substantially corresponding to the trajectory of the fuel-oxidizer mixture egressed from the fuel injection opening. In another embodiment, the deflector assembly defines a transition portion between the conical portion and the deflector wall. The transition portion defines an angle substantially corresponding to a radial angle of the trajectory of the fuel-oxidizer mixture egressed from the fuel injection opening. In yet another embodiment, the trajectory of the fuel-oxidizer mixture egressed from the fuel injection opening is at least partially along a circumferential direction and an axial direction relative to the nozzle centerline. The plurality of openings is disposed along the conical portion at least partially along the axial direction and the circumferential direction. In still yet another embodiment, the plurality of openings defines successive axial rows of openings along a downstream direction. A downstream row of the successive axial rows is circumferentially offset from an upstream row along the trajectory of the fuel-oxidizer mixture egressed from the fuel injection opening.

Another aspect of the present disclosure is directed to a gas turbine engine. The gas turbine engine includes a combustor assembly including a fuel nozzle disposed at least partially concentric to the nozzle centerline, the fuel nozzle defining a fuel injection opening. A deflector assembly is defined around the nozzle centerline extended therethrough. The deflector assembly includes a conical portion defined around the nozzle centerline, and wherein the conical portion defines a fuel nozzle opening. A plurality of openings is defined through the conical portion radially adjacent to the fuel injection opening at the fuel nozzle.

In various embodiments, a fuel-oxidizer mixture egresses from the fuel injection opening. The plurality of openings is disposed along the conical portion substantially corresponding to a trajectory of the fuel-oxidizer mixture egressed from the fuel injection opening. In one embodiment, the deflector assembly further defines a groove extended axially along the conical portion substantially corresponding to the trajectory of the fuel-oxidizer mixture egressed from the fuel injection opening. In another embodiment, the trajectory of the fuel-oxidizer mixture egressed from the fuel injection opening is at least partially along a circumferential direction and an axial direction relative to the nozzle centerline. The plurality of openings is disposed along the conical portion at least partially along the axial direction and the circumferential direction.

In one embodiment, the plurality of openings defines a first axial plurality of openings axially spaced apart from a second axial plurality of openings. The first axial plurality of openings defines a first opening geometry and the second axial plurality of openings defines a second opening geometry different from the first opening geometry.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a heat engine including a combustor assembly that improve deflector assembly cooling are generally provided. The deflector assembly may enable vectored flows of oxidizer to provide cooling to the deflector assembly along a trajectory of a flame brush from a fuel nozzle. A cooling air flow or curtain is directed by the trajectory of the flame brush relative to a conical portion of the deflector assembly. The flow of air from the deflector assembly may be circumferentially and/or axially staggered such as due to a circumferential and/or axial staggering of a plurality of openings at the conical portion of the deflector assembly. Such staggering of the flow of air from the plurality of openings may mitigate the risk of stationary hot gases being trapped between the cooling flows. Additionally, or alternatively, a groove defined in the conical portion of the deflector assembly further may guide the fuel flow trajectory away from the conical portion and deflector wall to improve deflector assembly cooling. Still further, various embodiments of the geometry of the plurality of openings enables providing the flow of air from while mitigating stoppage of the flow via recirculation zones.

Figure 1:
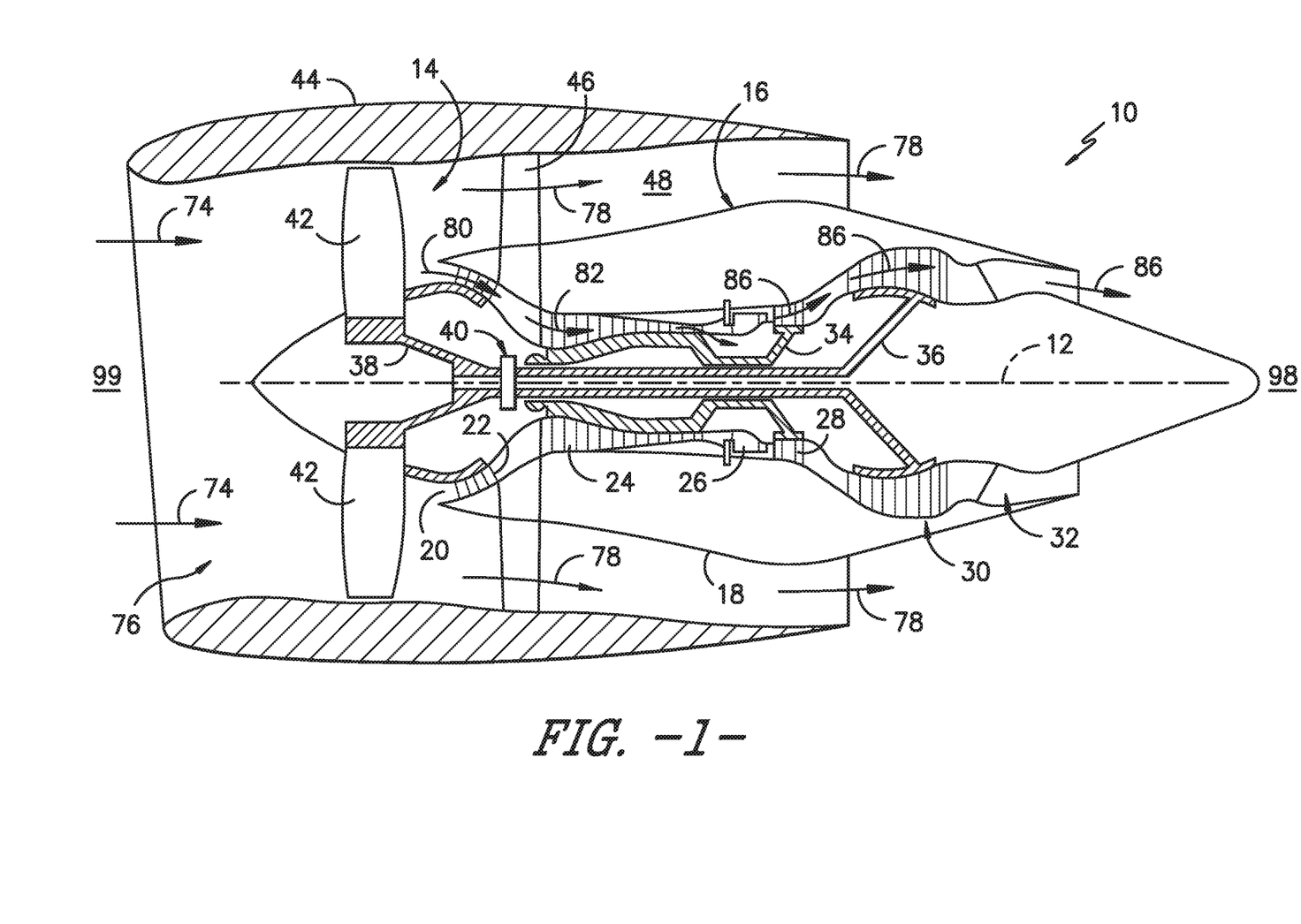
FIG. 1 is a schematic cross sectional view of an exemplary gas turbine engine incorporating an exemplary embodiment of a fuel injector and fuel nozzle assembly.

Referring now to the drawings, FIG. 1 is a schematic partially cross-sectioned side view of an exemplary gas turbine engine 10 herein referred to as "engine 10" as may incorporate various embodiments of the present invention. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
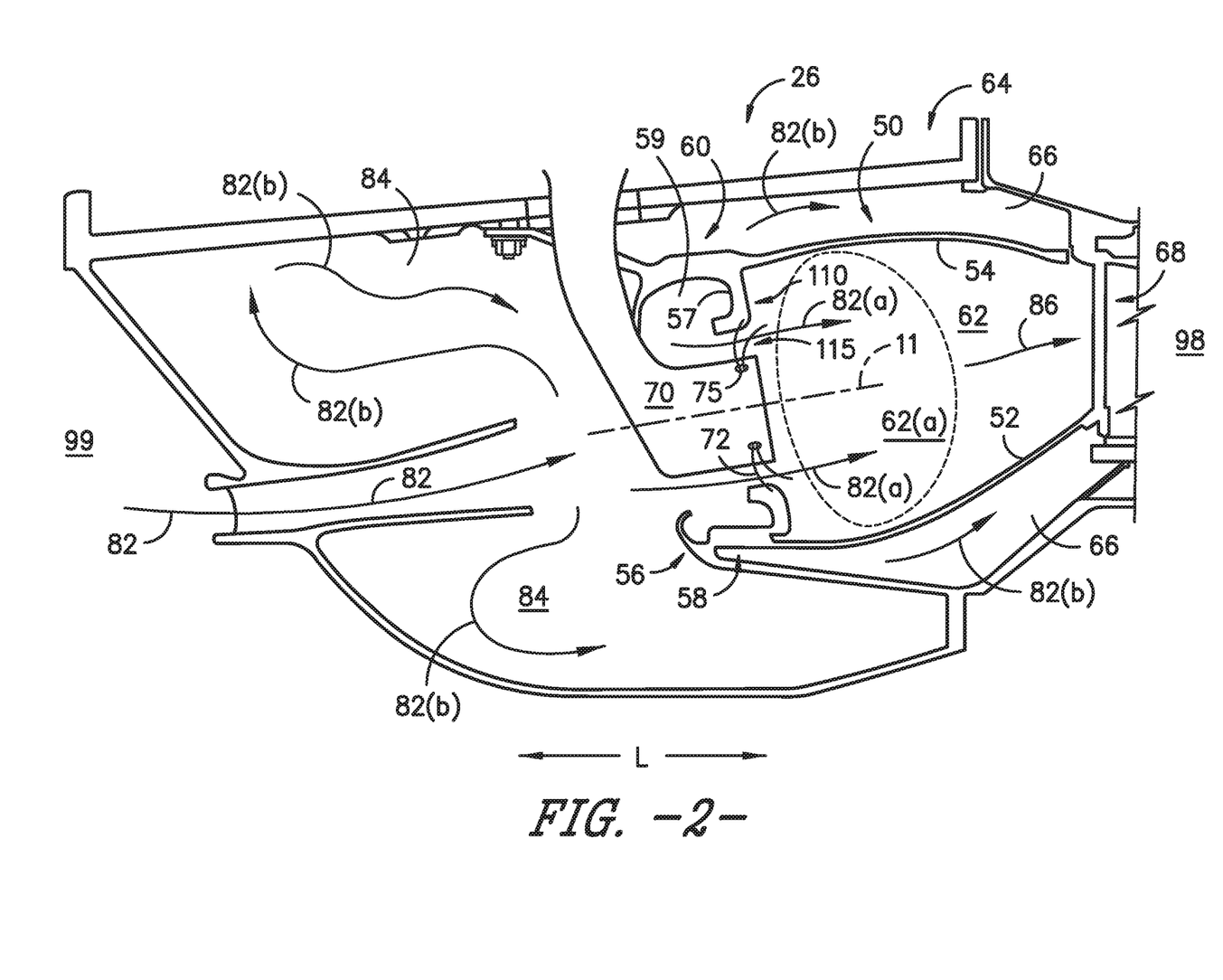
FIG. 2 is a cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include an annular type combustor assembly 50 having an annular inner liner 52, an annular outer liner 54, a bulkhead assembly 56, and a dome assembly 57 including a deflector assembly 110 together defining a combustion chamber 62. The combustion chamber 62 may more specifically define a region defining a primary combustion zone 62(a) at which initial chemical reaction of the fuel-oxidizer mixture and/or recirculation of the combustion products may occur before flowing further downstream. The bulkhead assembly 56 and the dome assembly 57 each extend radially between upstream ends 58, 60 of the radially spaced inner liner 52 and the outer liner 54, respectively. The dome assembly 57 is disposed downstream of the bulkhead assembly 56, adjacent to the generally annular combustion chamber 62 defined between the dome assembly 57, the inner liner 52, and the outer liner 54. More specifically, a deflector wall 111 (FIG. 3) of the deflector assembly 110 is defined generally adjacent to the combustion chamber 62, such as defining a generally radial upstream wall. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a diffuser or outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus at least partially defining a hot gas path between the combustor assembly 50 and the HP turbine 28.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows into a diffuser cavity or head end portion 84 of the combustion section 26.

The compressed air 82 pressurizes the diffuser cavity 84. A first portion of the of the compressed air 82, as indicated schematically by arrows 82(a) flows from the diffuser cavity 84 into the combustion chamber 62 where it is mixed with the fuel 72 and burned, thus generating combustion gases, as indicated schematically by arrows 86, within the combustor assembly 50.

More specifically, compressed air 82(a) flows into the combustion chamber 62 via a plurality of mixer assemblies 162 (omitted from FIG. 2 for clarity, shown in FIG. 3) placed in circumferentially adjacent arrangement relative to the axial centerline 12 in a cavity 59 between the bulkhead assembly 56 and the deflector assembly 110. Each fuel injector 70 is disposed in each mixer assembly 162 to provide a flow of fuel 72 (FIGS. 4 and 6) and support the combustion process. The mixer assembly 162 promotes a swirl component to the flow of compressed air 82(a) to promote efficient mixing with the flow of fuel 72. The deflector assembly 110 generally defines a heat shield that thermally insulates the bulkhead assembly 56 from the relatively high temperatures generated in the combustion chamber 62 during engine operation.

Typically, the LP and HP compressors 22, 24 provide more compressed air to the diffuser cavity 84 than is needed for combustion. Therefore, a second portion of the compressed air 82 as indicated schematically by arrows 82(b) may be used for various purposes other than combustion. For example, as shown in FIG. 2, compressed air 82(b) may be routed into the outer flow passage 66 to provide cooling to the inner and outer liners 52, 54. In addition or in the alternative, at least a portion of compressed air 82(b) may be routed out of the diffuser cavity 84. For example, a portion of compressed air 82(b) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 3:
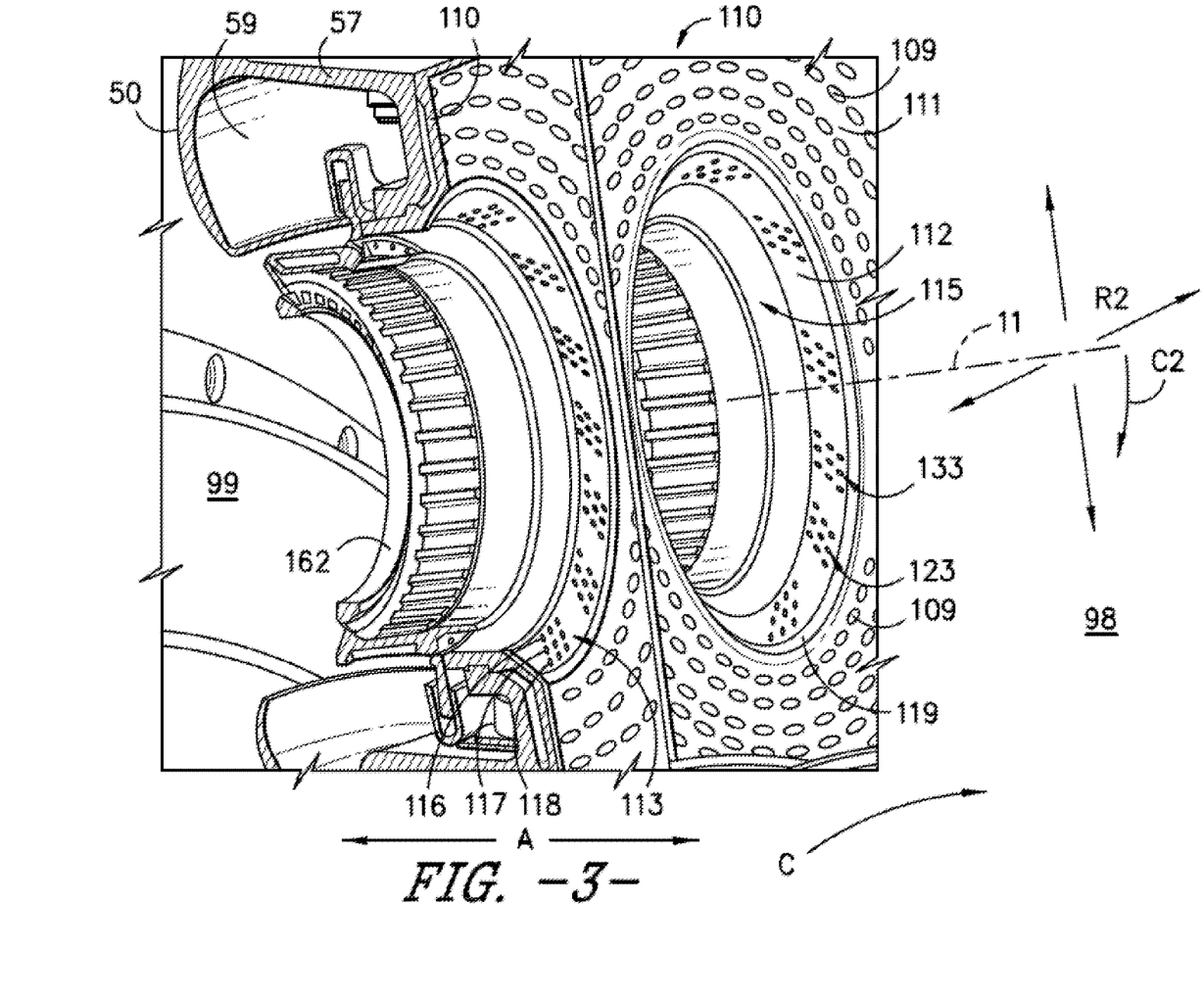
FIG. 3 is a perspective view of an exemplary embodiment of a deflector assembly of the combustor assembly of FIG. 2.
Figure 4:
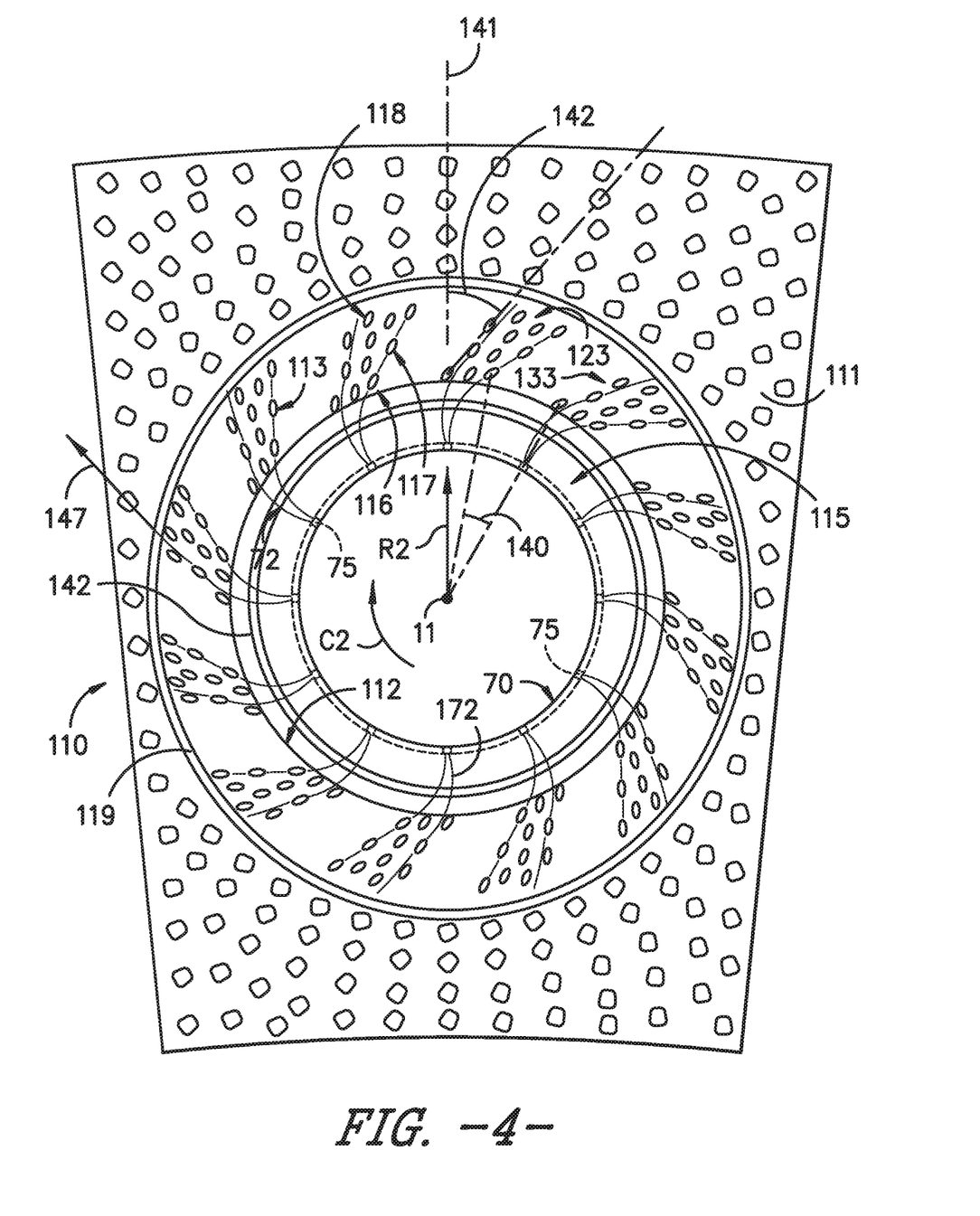
FIG. 4 is a flowpath view of an exemplary embodiment of a deflector assembly and fuel nozzle of the combustor assembly of FIG. 3.

Referring now to FIG. 3, a perspective view of an exemplary embodiment of a portion of the combustor assembly 50 is generally provided. Referring also to FIG. 4, a flowpath view of FIG. 3 from a downstream end 98 viewing toward an upstream end 99 is further provided. More specifically, a portion of the dome assembly 57 of the combustor assembly 50 and a fuel nozzle 70 extended therethrough is generally provided. The dome assembly 57 includes the deflector assembly 110 extended at least partially along a radial direction R and a circumferential direction C relative to the axial centerline 12 and adjacent to the combustion chamber 62. A deflector eyelet or fuel nozzle opening 115 is defined through the deflector assembly 110, through which the fuel nozzle 70 at least partially extends. A nozzle centerline 11 is extended through the deflector eyelet or fuel nozzle opening 115 along a lengthwise direction L.

The deflector assembly 110 is defined around the nozzle centerline 11 extended therethrough. The deflector assembly 110 includes a relatively flat deflector wall 111 extended at least partially along the radial direction R. The deflector assembly 110 further includes a conical portion 112 defined around the nozzle centerline 11. The conical portion 112 defines the fuel nozzle opening 115. A plurality of openings 113 is defined through the conical portion 112 radially adjacent to the fuel injection opening 75 at the fuel nozzle 70.

A portion of the deflector assembly 110 extended from a mixer assembly 162 to the liner 52 and is shaped to have the conical portion 112 and the relatively flat deflector wall 111. The angled portion of the deflector assembly 110 at the conical portion 112 may be defined relative to the axial direction A or axial centerline 12. A transition portion 119 is defined between the conical portion 112 and the deflector wall 111. The transition portion 119 generally defines a shaped or curved portion extended from the substantially axial conical portion 112 to the substantially radial deflector wall 111. The conical portion 112 may define a substantially constant angle around the circumference of each eyelet opening 115. However, in various embodiments, the angle of the conical portion 112 may vary around the circumference of the eyelet opening 115. In still various embodiments, the angle may vary for each eyelet opening 115 of the combustor assembly 50.

For example, in one embodiment, the angle at the radially inner and outer portions of the conical portion 112 may be approximately 45 degrees and an angle at a radial midpoint may be approximately 25 degrees. However, it should be appreciated that these angles may be varied to improve performance of the combustor assembly 50. For example, the conical angle at the radially inner and outer portions may vary between approximately 15 degrees and approximately 75 degrees. As another example, the conical portion at the radial midpoint may be between approximately 15 degrees and approximately 40 degrees.

The deflector wall 111 of the deflector assembly 110 is extended generally along the radial direction R toward the liners 52, 54. The deflector wall 111 may be defined substantially perpendicular relative to the axial centerline 12. In other embodiments, the deflector wall 111 may define an angle along the radial direction R relative to the axial centerline 12.

The deflector assembly 110 is generally contoured to stabilize the flow of air 82(a) through the mixer assembly 162 in a substantially non-varying flow pattern inside the combustion chamber 62. The stabilizing conical portion 112 is contoured around the mixer assembly 162 and a nozzle centerline 11 extended through the deflector assembly 110 at constant or varying angles to support an annular combustion chamber 62. More specifically, the conical portion 162 may generate an improved flow pattern emanating from the mixer assembly 162. The deflector wall 111 may provide a non-varying corner recirculation zone to help with flow stability. The combustor assembly 50 thereby achieves improved efficiency and performance.

Although the nozzle centerline 11 is generally provided, it should be appreciated that the fuel nozzle 70 may be disposed approximately concentric, or approximately eccentric, relative to the nozzle centerline 11 or the fuel nozzle opening 115. Therefore, the nozzle centerline 11 may be an approximation of a centerline through the fuel nozzle opening 115, with the fuel nozzle 70 concentric or eccentric through the fuel nozzle opening 115. A radial direction R2 is generally provided as reference extended from the nozzle centerline 11.

The plurality of openings 113 is defined in adjacent arrangement along conical portion 112 in the circumferential direction C2. In various embodiments, the plurality of openings 113 defines a first plurality of openings 123 circumferentially spaced apart from a second plurality of openings 133. In one embodiment, the first plurality of openings 123 is circumferentially spaced apart from the second plurality of openings 133 by between 3 degrees and 15 degrees, such as depicted via angle 140 extended from the nozzle centerline 11. In another embodiment, the first plurality of openings 123 is circumferentially spaced apart from the second plurality of openings 133 by the angle 140 between 3 degrees and 10 degrees. In yet another embodiment, the first plurality of openings 123 is circumferentially spaced apart from the second plurality of openings 133 by the angle 140 between 3 degrees and 7 degrees.

Referring still to FIGS. 3-4, in one embodiment, each successive opening is arranged in adjacent arrangement along the axial direction A. Additionally, each successive row of openings of the plurality of openings 113 may be shifted along the circumferential direction C2 relative to an upstream row. For example, the plurality of openings 113 defines an upstream-most axial row 116 and a downstream-most axial row 118 along the conical portion 112 of the deflector assembly 110. The plurality of openings 113 further defines one or more intermediate axial rows 117 between the upstream-most axial row 116 and the downstream-most row 118. In one embodiment, the downstream-most axial row 118 may be shifted along the circumferential direction C2 between 3 degrees and 17 degrees relative to the upstream-most row 116, such as depicted via angle 142 relative to the axial direction A. For example, the angle 142 may be extended along the conical portion 112 from a reference line 141 extended along the conical portion 112 along the axial direction A.

Referring still to FIG. 3, the deflector assembly 110 may include a plurality of cooling holes 109 through the deflector wall 111. This multi-hole surface can provide a multi-hole film cooling effect to the side of the deflector wall 111 exposed to the combustion chamber 62, such as to significantly reduce temperatures reached at the deflector assembly 110 during operation of the engine 10. In one exemplary embodiment, the cooling holes 109 are uniformly spaced and angled with respect to the deflector wall 111. For example, the cooling holes 109 may be angled between approximately 60 degrees and approximately 90 degrees relative to the deflector wall 111.

Figure 5:
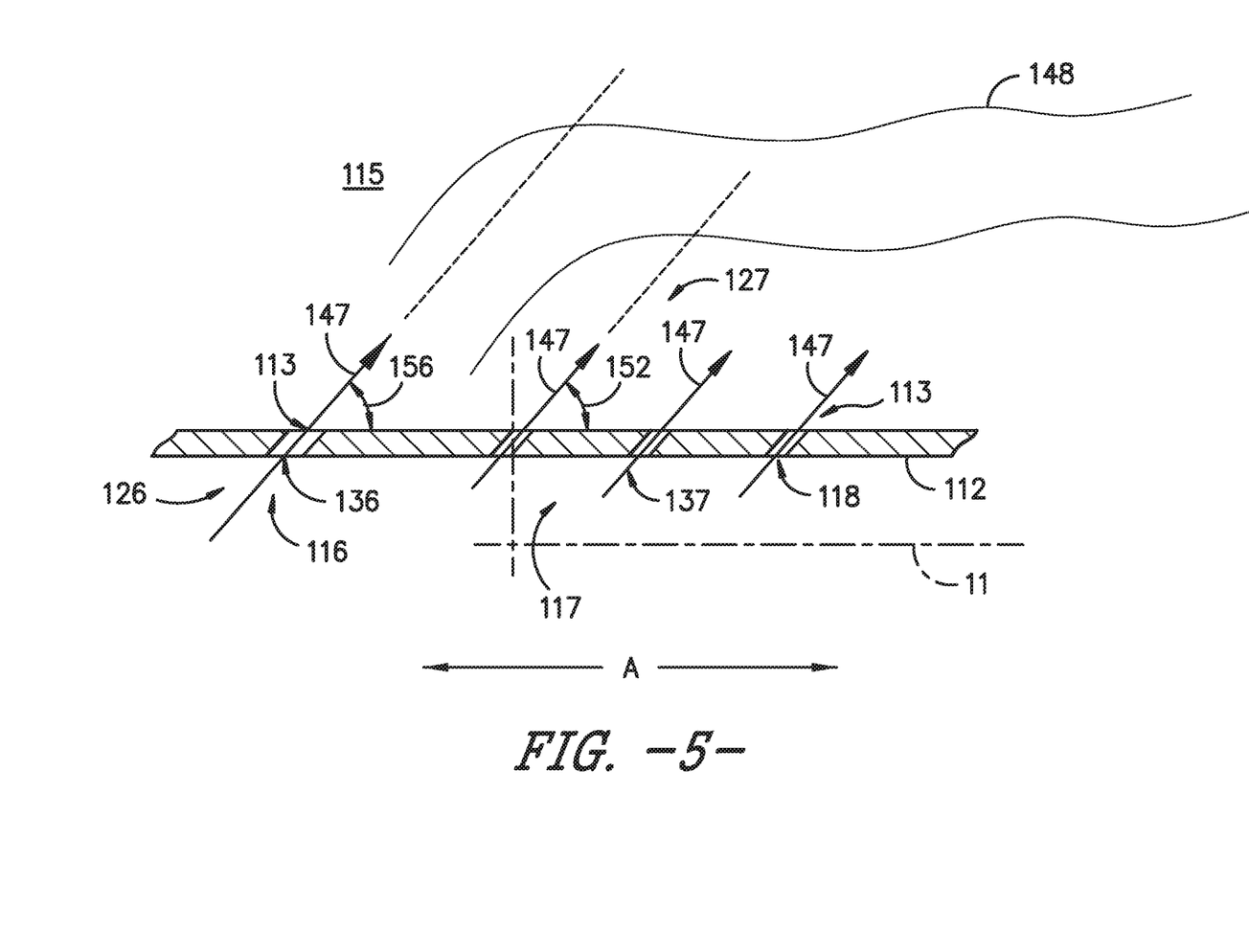
FIG. 5 is an exemplary embodiment of a portion of the deflector assembly of FIG. 3 according to an aspect of the present disclosure.

Referring now to FIG. 5, an exemplary embodiment of a portion of the conical portion 112 of the deflector assembly 110 is generally provided. In various embodiments, the plurality of openings 113 defines a first axial plurality of openings 126 axially spaced apart from a second axial plurality of openings 127 along the axial direction A. In one embodiment, the first axial plurality of openings 126 defines the upstream-most axial row 116 of the plurality of openings 113. In another embodiment, the second axial plurality of openings 127 defines the intermediate axial row 117, the downstream-most axial row 118, or both.

However, in another embodiment (not depicted), the first axial plurality of openings 126 may include the upstream-most axial row 116 and one or more of the intermediate axial rows 117 of the plurality of openings 113. The second axial plurality of openings 127 may include the downstream-most axial row 118 of the plurality of openings 113.

Referring still to FIG. 5, in various embodiments, the first axial plurality of openings 126 defines a first opening geometry 136 and the second axial plurality of openings 127 defines a second opening geometry 137 different from the first opening geometry 136. In one embodiment, the first opening geometry 136 defines a cross-sectional area between 5% and 50% greater than the second opening geometry 137. In another embodiment, the first opening geometry 136 defines a cross-sectional area between 10% and 40% greater than the second opening geometry 137. In still another embodiment, the first opening geometry 136 defines a cross-sectional area between 15% and 30% greater than the second opening geometry 137.

In still various embodiments, the first opening geometry 136 defines a substantially circular cross-sectional area. In other embodiments, the second opening geometry 137 defines a non-circular cross-sectional area. For example, the second opening geometry 137 may define a shaped opening such as to disposed a flow of oxidizer, shown as arrows 147, at least partially along the circumferential direction C2, the radial direction R2, the axial direction A (FIG. 3), or combinations thereof.

Referring still to FIG. 5, in various embodiments, the plurality of openings 113 is disposed at an acute angle through the conical portion 112 of the deflector assembly 110 relative to the nozzle centerline 11. In one embodiment, the first axial plurality of openings 126 defines an angle 156 through the conical portion 112 between approximately 5 degrees and approximately 75 degrees. In another embodiment, the second axial plurality of openings 127 defines an angle 157 through the conical portion 112 less than or equal to the angle 156 of the first axial plurality of openings 126.

Referring back to FIGS. 3-4, during operation of the engine 10, a fuel-oxidizer mixture 72 egresses from a fuel injection opening 75 of the fuel nozzle 70. The fuel-oxidizer mixture 72 may define a jet-in-crossflow (JIC) mixture egressing from the fuel nozzle 70 into the fuel nozzle opening 115 along the radial direction R2, the circumferential direction C2, and/or the axial direction A. In various embodiments, the plurality of openings 113 disposed along the conical portion 112 of the deflector assembly 110 are substantially corresponding to a trajectory of the fuel-oxidizer mixture 72 egressed from the fuel injection opening 75, such as shown at arrows 172.

In one embodiment, the fuel injection opening 75 at the fuel nozzle 70 may be defined substantially corresponding to one or more of the plurality of openings 113 at the deflector assembly 110. For example, in various embodiments, the fuel injection opening 75 may be defined substantially similarly as shown and described in regard to one or more of the first axial plurality of openings 126 and/or the second axial plurality of openings 127.

Referring still to FIGS. 3-5, the trajectory 172 of the fuel-oxidizer mixture 72 egressed from the fuel injection opening 75 may be at least partially along the circumferential direction C2 and the axial direction A relative to the nozzle centerline 11. The plurality of openings 113 may be disposed along the conical portion 112 at least partially along the axial direction A and the circumferential direction C2 such as substantially corresponding with the fuel injection opening 75 at the fuel nozzle 70. In another embodiment, the plurality of openings 113 may define successive axial rows of openings such as described in regard to the upstream-most axial row 116, the intermediate axial row 117, and the downstream-most axial row 118 along the downstream direction. The downstream-most axial row 118 may be offset along the circumferential direction C2 relative to the upstream-most axial row 116 substantially corresponding to the trajectory 172 of the fuel-oxidizer mixture 72 egressed from the fuel injection opening 75. Additionally, or alternatively, the one or more intermediate axial rows 117 may be offset along the circumferential direction C2 relative to the upstream-most axial row 116 substantially corresponding to the trajectory 172 of the fuel-oxidizer mixture 72 egressed from the fuel injection opening 75.

Figure 6:
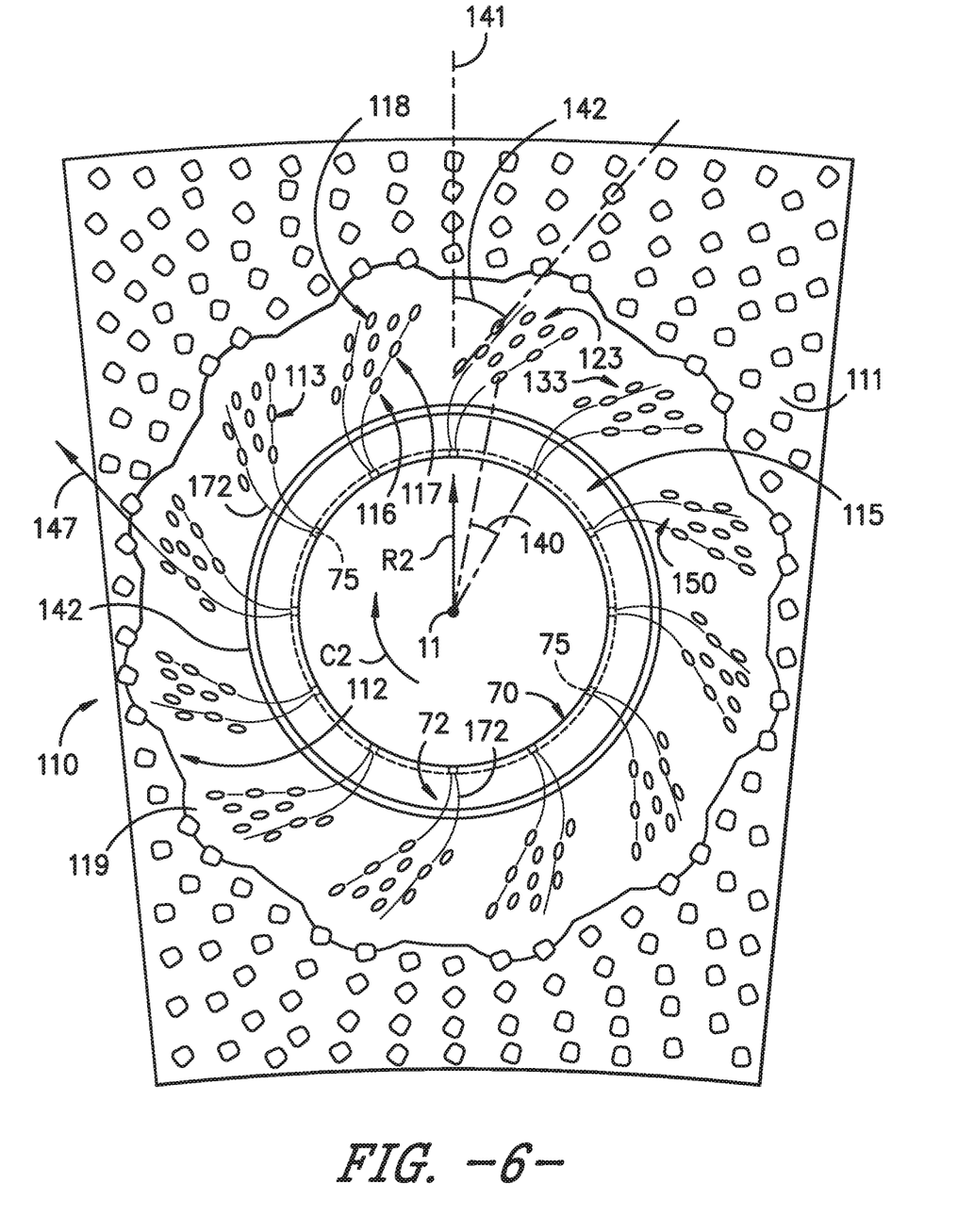
FIG. 6 is a flowpath view of another exemplary embodiment of a deflector assembly and fuel nozzle of the combustor assembly of FIG. 2.
Figure 7:
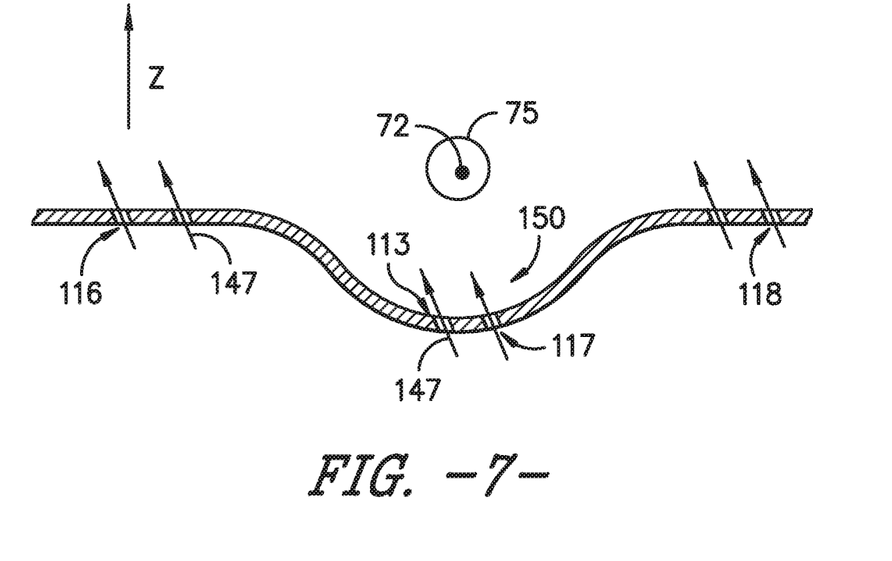
FIGS. 7-8 are exemplary embodiments of portions of the deflector assembly of FIG. 5 according to aspects of the present disclosure.
Figure 8:
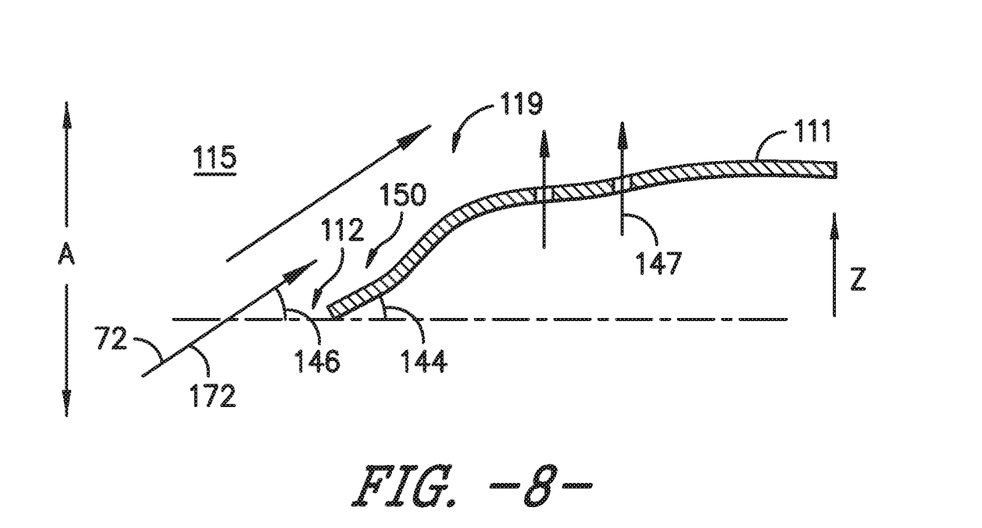

Referring now to FIGS. 6-8, another exemplary embodiment of a portion of the deflector assembly 110 is generally provided. FIG. 6 provides a flowpath view of the deflector assembly 110 configured substantially similarly as shown and described in regard to FIGS. 3-4. FIGS. 7-8 further detail embodiments of portions of the deflector assembly 110. A reference projection Z is defined relative to the surface of the surfaces of the deflector assembly 110 and extended therefrom, such as substantially toward the nozzle centerline 11. Referring to FIGS. 6-7, the deflector assembly 110 may further include a groove 150 extended along the axial direction A along the conical portion 112 of the deflector assembly 110. In one embodiment, the groove 150 substantially corresponds to the trajectory 172 of the fuel-oxidizer mixture 72 egressed from the fuel injection opening 75 of the fuel nozzle 70. As such, in various embodiment, the groove 150 may generally extend through the conical portion 112 of the deflector assembly 110 at least partially along the circumferential direction C2, the radial direction R2, and the axial direction A.

Referring now to FIG. 8, another exemplary embodiment of a portion of the deflector assembly 110 is generally provided. The deflector assembly 110 may further define a transition portion 119 between the conical portion 112 and the deflector wall 111. The transition portion 119 defines an angle 144 substantially corresponding to a radial angle 146 of the trajectory 172 of the fuel-oxidizer mixture 72 egressed from the fuel injection opening 75. For example, the radial angle 146 is generally defined relative to the radial direction R2 from the nozzle centerline 11. In various embodiments, the radial angle 146 and the angle 144 of the transition portion 119 are substantially equal.

Embodiments of the combustor assembly 50 including the deflector assembly 110 enable vectored flows of oxidizer 147 to provide cooling to the deflector assembly 110 along the trajectory 172 of the flame brush from the fuel-oxidize mixture 72. A cooling air flow or curtain 148 (FIG. 4) is directed by the trajectory 172 of the flame brush from the fuel-oxidizer mixture 72 relative to the conical portion 112 of the deflector assembly 110. The flow of air 148 from the deflector assembly 110 may be staggered along the circumferential direction C2, the axial direction A, or both such as described in regard to the plurality of openings 113, or more specifically, the first axial plurality of openings 126, the second axial plurality of openings 127, the upstream-most axial row 116, the intermediate axial row 117, the downstream-most axial row 118, or combinations thereof. Such staggering of the flow of air 148 from the plurality of openings 113 may mitigate the risk of stationary hot gases (i.e., combustion gases 86, the fuel-oxidizer mixture 72) trapped between the cooling flows. Additionally, or alternatively, the groove 150 defined in the conical portion 112 of the deflector assembly 110 further may guide the fuel flow trajectory 172 away from the conical portion 112 and deflector wall 111 to improve deflector assembly 110 cooling. Still further, the various embodiments of the first opening geometry 136 and the second opening geometry 137 enable providing the flow of air 148 from the plurality of openings 113 while mitigating stoppage of the flow 148 via recirculation zones.

All or part of the combustor assembly 50 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor assembly 50, including, but not limited to, the liners 52, 54, the deflector assembly 110, or combinations thereof. Furthermore, the combustor assembly 50, or portions thereof, such as the deflector assembly 110, may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, titanium and titanium-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a heat engine, the combustor assembly defining a fuel nozzle centerline, an axial direction extending along the fuel nozzle centerline, a radial direction extended from the fuel nozzle centerline, and a circumferential direction extending circumferentially about the fuel nozzle centerline, the combustor assembly comprising:
a fuel nozzle disposed at least partially concentric to the fuel nozzle centerline, the fuel nozzle defining a plurality of fuel injection openings extending in the radial direction and circumferentially spaced about the fuel nozzle; and
a deflector assembly defined circumferentially around the fuel nozzle centerline extended therethrough, wherein the deflector assembly comprises a deflector wall extended at least partially along the radial direction, and further wherein the deflector assembly comprises a conical portion defined circumferentially around the fuel nozzle centerline and radially outward of the plurality of fuel injection openings, and wherein the deflector assembly defines a fuel nozzle opening circumferentially around the fuel nozzle centerline, the conical portion being connected with the deflector wall at a downstream end of the conical portion and connected with the fuel nozzle opening at an upstream end of the conical portion, and further wherein a plurality of openings is defined through the conical portion, the plurality of openings being arranged in a plurality of groups, each group comprising an array having a plurality of openings arranged in a plurality of rows with respect to the axial direction and a plurality of openings arranged in a plurality of rows with respect to the circumferential direction, each group being arranged radially adjacent to a respective fuel injection opening at the fuel nozzle, and wherein each group is circumferentially spaced apart from an adjacent group so as to define a circumferential gap between each group, wherein the plurality of openings within each group are separated by a distance that is smaller than the circumferential gap.

2. The combustor assembly of claim 1, wherein each group of the plurality of openings is circumferentially spaced apart from an adjacent group by between 3 degrees and 15 degrees.

3. The combustor assembly of claim 1, wherein, in the array of each group, a downstream-most row of the plurality of openings is offset circumferentially relative to an upstream-most row of the plurality of openings by between 3 degrees and 17 degrees.

4. The combustor assembly of claim 1, wherein, in each array, a first circumferential row of the plurality of openings defines a first opening geometry and a second circumferential row of the plurality of openings defines a second opening geometry different from the first opening geometry.

5. The combustor assembly of claim 4, wherein the first opening geometry defines a cross-sectional area between 5% and 50% greater than the second opening geometry.

6. The combustor assembly of claim 4, wherein the first opening geometry defines a substantially circular cross-sectional area.

7. The combustor assembly of claim 4, wherein the second opening geometry defines a non-circular cross-sectional area.

8. The combustor assembly of claim 1, wherein a fuel-oxidizer mixture egresses from the respective fuel injection openings, and wherein the respective groups of the plurality of openings are disposed along the conical portion substantially corresponding to a trajectory of the fuel-oxidizer mixture egressed from the respective fuel injection openings.

9. The combustor assembly of claim 8, wherein the deflector assembly further defines a groove extended axially along the conical portion substantially corresponding to the trajectory of the fuel-oxidizer mixture egressed from the respective fuel injection openings.

10. The combustor assembly of claim 9, wherein the deflector assembly defines a transition portion between the conical portion and the deflector wall, and wherein the transition portion defines an angle substantially corresponding to a radial angle of the trajectory of the fuel-oxidizer mixture egressed from the fuel injection openings.

11. The combustor assembly of claim 8, wherein the trajectory of the fuel-oxidizer mixture egressed from the respective fuel injection openings is at least partially along a circumferential direction and an axial direction relative to the fuel nozzle centerline.

12. The combustor assembly of claim 11, wherein, in each array, the plurality of openings defines successive rows of openings along a downstream direction, and wherein a downstream row of the successive rows is circumferentially offset from an upstream row along the trajectory of the fuel-oxidizer mixture egressed from the respective fuel injection opening.

13. A gas turbine engine, the gas turbine engine comprising:
a combustor assembly, wherein the combustor assembly defines a fuel nozzle centerline, an axial direction along the fuel nozzle centerline, a radial direction extended from the fuel nozzle centerline, and a circumferential direction extending circumferentially about the fuel nozzle centerline, and wherein the combustor assembly comprises:
a fuel nozzle disposed at least partially concentric to the fuel nozzle centerline, the fuel nozzle defining a plurality of fuel injection openings extending in the radial direction; and
a deflector assembly defined circumferentially around the fuel nozzle centerline extended therethrough, wherein the deflector assembly comprises a conical portion defined circumferentially around the fuel nozzle centerline and radially outward of the fuel injection opening, and wherein the deflector assembly defines a fuel nozzle opening circumferentially around the fuel nozzle centerline, the conical portion being connected with the deflector wall at a downstream end of the conical portion and connected with the fuel nozzle opening at an upstream end of the conical portion, and further wherein a plurality of openings is defined through the conical portion, the plurality of openings being arranged in a plurality of groups, each group comprising an array having a plurality of openings arranged in a plurality of rows with respect to the axial direction, and a plurality of openings arranged in a plurality of rows with respect to the circumferential direction, each group being arranged radially adjacent to a respective fuel injection opening at the fuel nozzle, and wherein each group is circumferentially spaced apart from an adjacent group so as to define a circumferential a gap between each group, wherein the plurality of openings within each group are separated by a distance that is smaller than the circumferential gap.

14. The gas turbine engine of claim 13, wherein a fuel-oxidizer mixture egresses from the respective fuel injection openings, and wherein the respective groups of the plurality of openings are disposed along the conical portion substantially corresponding to a trajectory of the fuel-oxidizer mixture egressed from the respective fuel injection openings.

15. The gas turbine engine of claim 14, wherein the deflector assembly further defines a groove extended axially along the conical portion substantially corresponding to the trajectory of the fuel-oxidizer mixture egressed from the respective fuel injection openings.

16. The gas turbine engine of claim 14, wherein the trajectory of the fuel-oxidizer mixture egressed from the respective fuel injection openings is at least partially along a circumferential direction and an axial direction relative to the fuel nozzle centerline.

17. The gas turbine engine of claim 13, wherein, in each array, the plurality of openings defines a first plurality of openings arranged in a first row circumferentially, and a second plurality of openings arranged in a second row circumferentially, the first row being axially spaced apart from the second row, wherein the first plurality of openings defines a first opening geometry and the second plurality of openings defines a second opening geometry different from the first opening geometry.

* * * * *